Oct. 20, 1970     R. C. BARHORST     3,534,507
CENTERLESS GRINDER
Filed June 13, 1968
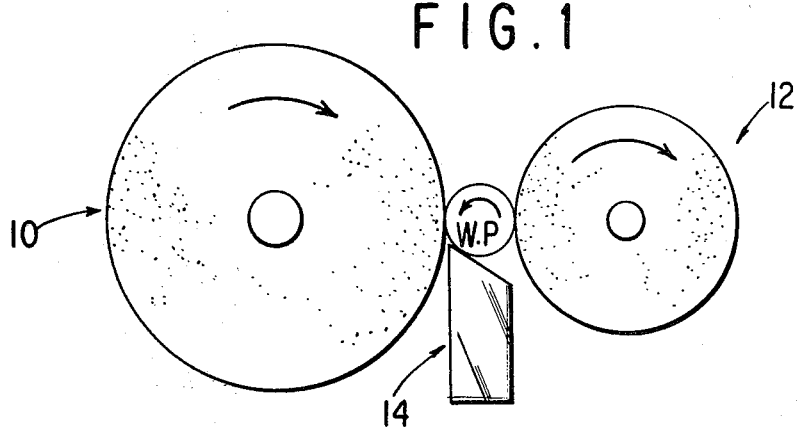
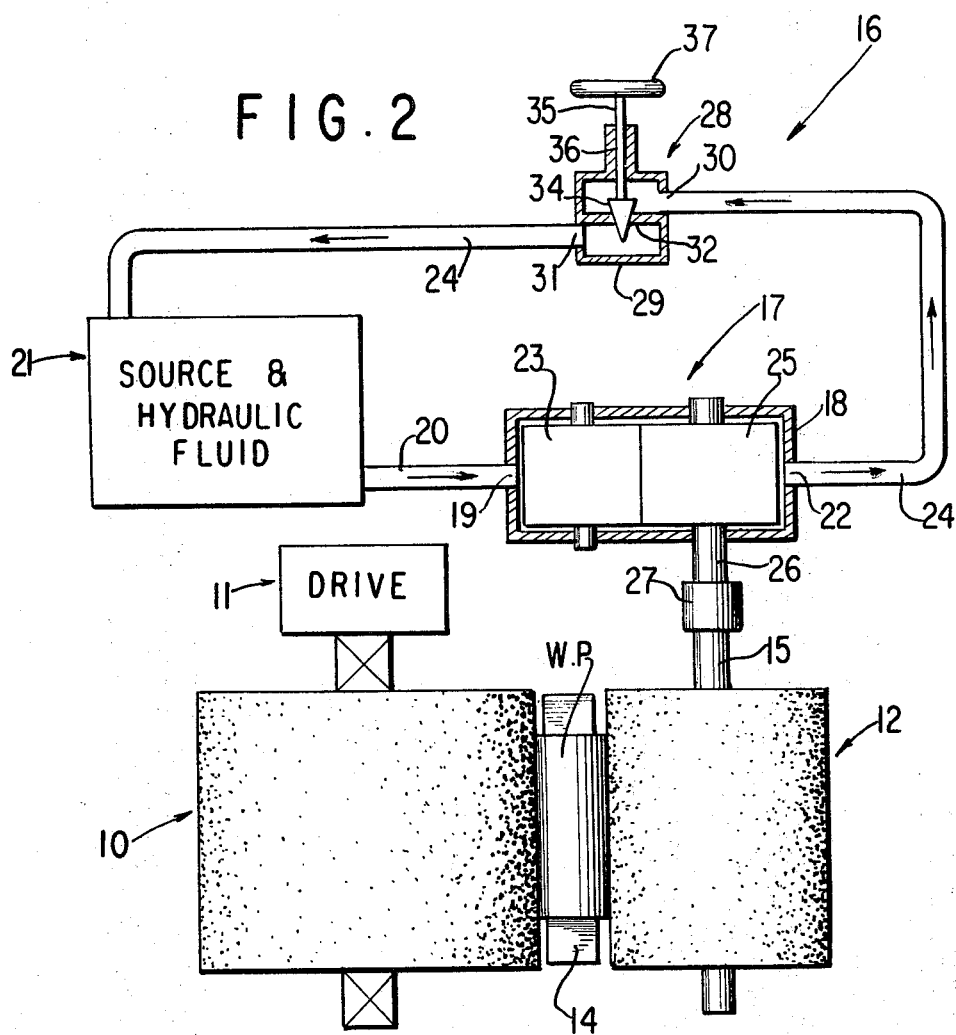
INVENTOR
ROBERT C. BARHORST
BY
Ernest G. Jensen
ATTORNEY

United States Patent Office 3,534,507
Patented Oct. 20, 1970

3,534,507
CENTERLESS GRINDER
Robert C. Barhorst, Pompton, N.J., assignor to Glebar Company, Inc., Franklin Lakes, N.J., a corporation of New Jersey
Filed June 13, 1968, Ser. No. 736,763
Int. Cl. B24b 5/18
U.S. Cl. 51—103                       3 Claims

ABSTRACT OF THE DISCLOSURE

A centerless grinder wherein the speed of rotation of the regulating wheel is controlled by a hydraulic device having a rotor and an output shaft connected for rotation with the regulating wheel and having a body provided with an inlet connected to a source of hydraulic fluid under pressure and an outlet conduit for returning the fluid to the source, the rotor being disposed in the body between the inlet and the outlet conduit, and an adjustable valve in the outlet conduit for restricting flow of the fluid through the body of the device.

BACKGROUND OF THE INVENTION

Field of the invention

The present invention relates to centerless grinders which include a work wheel, a regulating wheel facing the work wheel, and a work rest for supporting the work piece between the wheels. In such machines, the work wheel if rotated clockwise rotates the work counter-clockwise which in turn tends to rotate the regulating wheel clockwise.

Description of the prior art

Heretofore, it has been customary to drive the work wheel by a powerful electric motor through belts and pulley at a high surface speed and to drive the regulating wheel by a much less powerful electric motor at a lesser surface speed so that the regulating wheel regulates the speed of rotation of the work piece as it is being ground. The rotational speed of the work piece is varied by varying the rotational speed of the regulating wheel through a transmission mechanism such as a gear train, variable speed pulley and the like connected between the regulating wheel shaft and its drive motor.

A deficiency of such mechanisms is that by reason of their inherent nature they can cause backlash or over-ride of the regulating wheel. This results in improper grinding of the work piece, and under certain conditions may create a serious safety hazard if the regulating wheel loses control of the work piece.

SUMMARY OF THE INVENTION

Accordingly, an object of the present invention is to overcome the foregoing difficulties and disadvantages.

Another object is to provide a drive for the regulating wheel which has zero backlash or over-ride.

Another object is to provide such a drive which is simple, durable and economical in construction.

A further object is to provide such a drive which is reliable in operation.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are generally accomplished by providing a centerless grinding machine comprising the combination of a work wheel and a regulating wheel arranged for receiving a work piece to be ground there-between; a work rest for supporting the work piece; drive means for effecting rotation of the work wheel; a shaft having the regulating wheel mounted thereon for rotation therewith; a hydraulic device including a body provided with an inlet connected to a source of hydraulic fluid under pressure and provided with an outlet having a conduit connected thereto for returning the fluid to the source, and a rotor in the body between the inlet and the outlet having a shaft connected to the regulating wheel shaft for rotation therewith; and valve means in the outlet conduit for restricting the flow of fluid through the body.

BRIEF DESCRIPTION OF THE DRAWING

FIG. 1 is a schematic side elevational view of a centerless grinder in accordance with the present invention.

FIG. 2 is a schematic plan view of the centerless grinder shown in FIG. 1 with certain parts in section.

DESCRIPTION OF THE PREFERRED EMBODIMENT

Referring now to the drawing in detail, the essential elements of a centerless grinder are shown which include a work wheel 10, a drive 11 for the work wheel including a motor, pulleys and a belt (not shown), a regulating wheel 12 facing the work wheel, a work rest 14 for supporting a work piece WP between the work wheel and the regulating wheel, a shaft 15 having the regulating wheel mounted thereon for rotation therewith, and a hydraulic system 16 (FIG. 2) for controlling the speed of rotation of the regulating wheel.

The hydraulic system 16 comprises a hydraulic device 17 such as a hydraulic motor or turbine which includes a body 18 provided with an inlet 19 connected by a conduit 20 to a source 21 of hydraulic fluid under pressure and provided with an outlet 22 having a conduit 24 connected thereto for returning the fluid to the source, an idler gear 23 rotatably mounted in the body 18 near the inlet 19, and a gear 25 rotatably mounted in the body 18 in mesh with the gear 23 and having a shaft 26 connected to the regulating wheel shaft 15 at 27 for rotation therewith; and a valve 28 in the outlet conduit 24 for restricting the flow of fluid through the body of the hydraulic device 17.

The valve 28 is conventional in construction and comprises a body 29 having an inlet 30 and an outlet 31, a valve seat 32 between the inlet and the outlet, a valve member 34 connected to a stem 35 threadedly mounted at 36 in the valve body, and a handle 37 for effecting rotation of the stem and thereby adjustably moving the valve member to control the degree of restriction of the valve seat from fully open to fully closed.

In operation, the work wheel 10 is rotated clockwise by the drive 11 at a desired speed, the hydraulic fluid controls the rotation of the rotor 25 to allow the regulating wheel 12 to turn in a clockwise direction but more slowly than the work wheel, and the work piece WP is rotated counter-clockwise as it is being ground.

The speed of rotation of the regulating wheel depends upon the rate at which the hydraulic fluid is allowed to pass through the hydraulic device 17. Thus, when the valve 28 is fully open, the speed of rotation of the regulating wheel is maximum; and when the valve is fully closed, rotation of the regulating wheel is stopped. Intermediate positions of the valve member 34 with respect to the seat 32 accurately control the desired speed of rotation lesser than maximum. All this is accomplished without backlash or over-ride because the hydraulic fluid in a practical sense is incompressible and the conduit 20, the body 18 and the section of the conduit 24 between the body and the valve 28 are completely filled with fluid at all times. In this manner, the rotation of the rotor 25 is controlled solely by the flow of a solid stream of fluid.

SUMMATION

From the foregoing description it will be seen that the present invention provides an improved arrangement for controlling the rotation of a regulating wheel of a centerless grinder. There are no moving parts which require maintenance or repair.

Other advantages are (1) reversal of rotation can be quickly accomplished by merely reversing the position of the pressure and discharge lines, (2) cam operated or electrical programming controls can be utilized to vary the speed of the regulating wheel as the operation proceeds by regulating the flow of the hydraulic fluid; (3) the hydraulic drive can absorb shocks which could damage mechanical drives; and (4) a low output speed hydraulic motor makes it possible to drive the regulating wheel at low speed yet having a large flow of hydraulic fluid which can be metered more accurately.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

We claim:

1. In a centerless grinder, the combination of a work wheel and a regulating wheel arranged for receiving a work piece therebetween; a work rest for supporting the work piece, drive means for effecting rotation of said work wheel; a shaft having said regulating wheel mounted thereon for rotation therewith; a hydraulic device including a body provided with an inlet connected to a source of hydraulic fluid under pressure and provided with an outlet having a conduit connected thereto for returning the fluid to the source, and a rotor in said body between said inlet and said outlet having a shaft connected to said regulating wheel shaft for rotation therewith; and valve means in said outlet conduit for restricting the flow of fluid through said body.

2. In a centerless grinder, according to claim 1, wherein said valve means has adjustable means for controlling the degree of restriction of the fluid so that the speed of rotation of said regulating wheel can be adjusted.

3. In a centerless grinder according to claim 2, wherein said adjustable means has a fully closed position for stopping rotation of said regulating wheel.

References Cited

UNITED STATES PATENTS 1,777,607   10/1930   Ekholm et al. _____ 51—103

LESTER M. SWINGLE, Primary Examiner